(12) United States Patent
Engelholm

(10) Patent No.: US 6,814,653 B2
(45) Date of Patent: Nov. 9, 2004

(54) DEVICE FOR PEELING OR SHAPING PRODUCTS

(75) Inventor: Torbjörn Engelholm, Närpes (FI)

(73) Assignee: Oy Formit Invest Ab, Narpes (FI)

( * ) Notice: Subject to any disclaimer, the term of this patent is extended or adjusted under 35 U.S.C. 154(b) by 314 days.

(21) Appl. No.: 10/105,810

(22) Filed: Mar. 21, 2002

(65) Prior Publication Data

US 2002/0137443 A1 Sep. 26, 2002

(30) Foreign Application Priority Data

Mar. 23, 2001 (FI) .............................................. 20010602

(51) Int. Cl.[7] .............................................. B24B 7/00
(52) U.S. Cl. ...................................... 451/190; 451/194
(58) Field of Search .................................. 451/190, 194, 451/207, 132, 133, 134; 99/584, 590; 15/3.13, 3.17

(56) References Cited

U.S. PATENT DOCUMENTS 3,721,345 A * 3/1973 Brown et al. ................ 209/669
3,862,682 A 1/1975 Russell
5,396,837 A * 3/1995 Backus ........................ 99/590

FOREIGN PATENT DOCUMENTS

| EP | 0 573 125 A1 | 12/1993 |
| EP | 0 664 679 B1 | 4/1998 |
| FI | 67657 | 1/1985 |
| FR | 2 567 723 | 1/1986 |

* cited by examiner

Primary Examiner—Dung Van Nguyen
(74) Attorney, Agent, or Firm—Nixon & Vanderhye P.C.

(57) ABSTRACT

The invention relates to a device for peeling or shaping products such as potatoes comprising a frame, at least a first and a second grinding roller rotationally supported by the frame, at least one of the rollers comprising a grinding surface intended to contact the product during peeling or shaping, and a driving device for rotating the grinding rollers the first grinding roller comprising a substantially cylindrical body provided with axially adjacent peripheral grooves. To be able to make products of varying sizes with the same device, the device comprises means for adjusting the distance between said first and second grinding roller. The second grinding roller comprises a substantially cylindrical body provided with axially adjacent protrusions, which at least partly extend into the grooves when the distance between said first and second grinding roller is minimized.

8 Claims, 2 Drawing Sheets

DEVICE FOR PEELING OR SHAPING PRODUCTS

Figure 1:
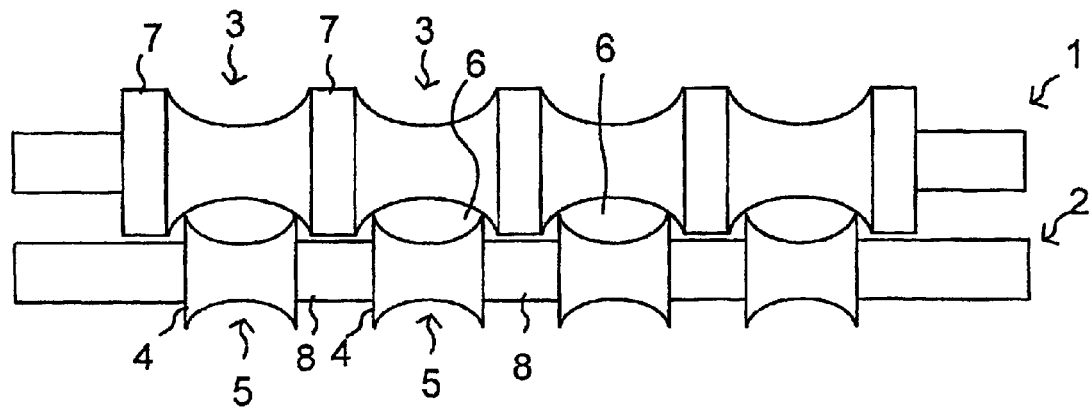

The present invention relates to a device and a roller for peeling or shaping products. The following describes the invention primarily in connection with peeling potatoes. However, it should be noted that this is only an example of an application of the invention. The invention is thus also applicable to peeling or shaping other products, such as carrots or apples. The invention is also applicable to shaping French fries, for example.

It is previously known to utilize a device having rotating rollers for mechanically processing potatoes. Such a device is described in EP-664 679 B1. This known device comprises parallel, rotating roller pairs having a grinding surface. The rollers comprise a substantially cylindrical body provided with axially adjacent peripheral grooves. The peripheral grooves in a roller pair are arranged opposite each other, so that a number of outlet openings forms for the processed potato balls to fall through.

A drawback in this known device is the constant size of the end product. Irrespective of the size of the raw material fed in the device, the end product will always have the same size. The reason for this is that the size of the end products is dependent on the dimensions of the peripheral grooves arranged in the rollers. The processing of the raw material does not stop until the raw material is processed to a size allowing the products to fall through the outlet openings between the rollers. The only way to obtain an end product having a different size is to replace the rollers with other rollers that have peripheral grooves of different dimensions. However, in practice, this is an expensive and laborious way to try to obtain end products having different sizes, since it requires an investment in rollers having varying dimensions and relatively laborious measures in replacing the rollers.

The object of the present invention is to solve the above problems and to provide a solution for easier and more inexpensive way to obtain end products having varying sizes. This object is achieved with a device for peeling or shaping potatoes or the like products, comprising a frame, at least a first and a second grinding roller rotationally supported by the frame, at least one of the rollers comprising a grinding surface intended to contact the product during peeling or shaping, the grinding rollers being arranged substantially parallel adjacent to each other for peeling or shaping the product, and a driving device for rotating the grinding rollers, the first grinding roller comprising a substantially cylindrical body provided with axially adjacent peripheral grooves. The device of the present invention is characterized in that the device comprises means for adjusting the distance between said first and second grinding roller, and that the second grinding roller comprises a substantially cylindrical body provided with axially adjacent protrusions, the peripheral grooves of the first grinding roller and the protrusions of the second grinding roller being dimensioned and arranged relative to each other such that the protrusions at least partly extend into the grooves when the distance between said first and second grinding roller is minimized.

The invention also relates to a roller usable in the device of the present invention. The roller for a device for peeling or shaping potatoes or the like products comprises a grinding surface intended to contact the product during peeling or shaping, and a substantially cylindrical body comprising adjacent peripheral grooves. The roller is characterized in that the substantially cylindrical body is provided with axially adjacent protrusions.

The present invention utilizes a roller provided with protrusions. Herein, protrusions refer to sections having a larger diameter than the diameter of the other parts of the roller. The use of such a roller together with a known roller, i.e. a roller comprising axially adjacent peripheral grooves, provides a solution allowing variation in the size of the end products by adjustment of the distance between the rollers. The adjustment of the distance between the rollers results in a variation in the dimensions of the outlet openings defined by the protrusions and the grooves, which again results in a variation in the size of the end product. Accordingly, the present invention enables the achievement of end products having varying sizes by the use of the same equipment, i.e. the same rollers and device.

Figure 2:
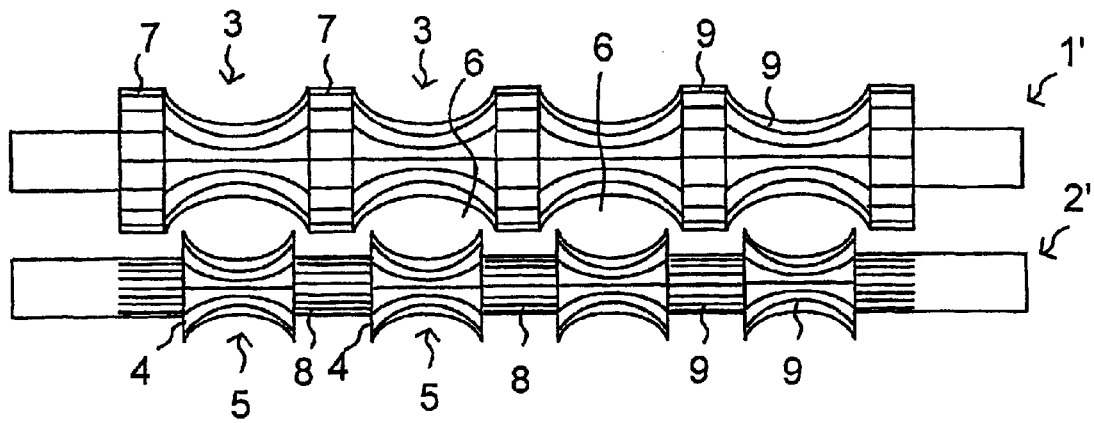
Figure 3:
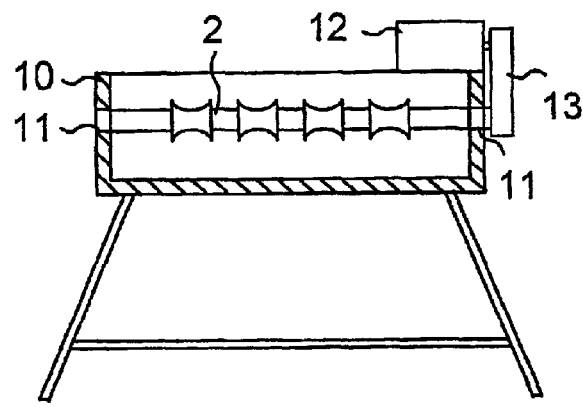
Figure 4:
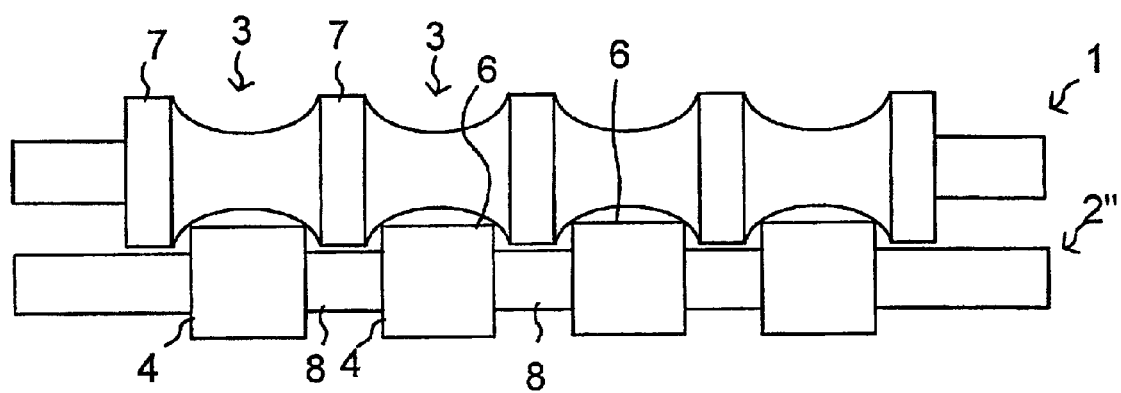

In the following, the invention will be described in detail by means of examples with reference to the accompanying figures, in which FIG. 1 shows a pair of rollers according to a first embodiment of the invention, FIG. 2 shows a pair of rollers according to a second embodiment of the invention, FIG. 3 shows an embodiment of a device of the invention, and FIG. 4 shows a pair of rollers according to a third embodiment of the invention.

FIG. 1 shows a pair of rollers according to a first embodiment of the invention. The first roller 1 is a grinding roller of a type known per se. This roller comprises a substantially cylindrical body provided with axially adjacent peripheral grooves 3.

The second roller 2 is a grinding roller comprising a substantially cylindrical body provided with axially spaced protrusions 4. The protrusions 4 comprise peripheral grooves 5 in the same way as the body of the first roller but have flat radial surfaces at each end thereof.

FIG. 1 shows the first and second rollers in a position in which they are disposed in a device (seen from above) for peeling or shaping. Naturally, the number of rollers may exceed tow. As FIG. 1 shows, the adjacent and parallel rollers 1 and 2 are shaped and arranged in the device such that the grooves 3 of the first roller 1 are disposed in places corresponding to those where the protrusions of the second roller 2 are disposed. Accordingly, the protrusions 4 partly extend into the grooves 3 when the distance between the rollers is minimized, as is the case in FIG. 1. Outlet openings 6 form between the grooves 5 of the protrusions and the grooves 3 of the first roller. The size of these outlet openings depends on how far into the grooves 3 the protrusions extend, i.e., in practice the size of the outlet openings 6 depends on the distance between the rollers 1 and 2.

When the rollers 1 and 2 are utilized in a device for peeling or shaping, the rollers 1 and 2 rotate. The direction of rotation of the rollers may be the same or opposite. The rate of rotation may also be different. A product to be processed is released onto the two rollers shown in FIG. 1. In FIG. 1, the rollers are provided with a coarse grinding surface of carborundum, for example. At least one of the rollers must have a grinding surface, but both rollers may be provided with a grinding surface to intensify the peeling or processing of the product. This coarse grinding surface is arranged in the grooves 3 and 5, in the area 7 between the grooves and in the area 8 between the protrusions 4. Accordingly, the product is exposed to the coarse grinding surface, and the rotation of the rollers subjects it to a grinding effect. This grinding effect sets the product in rotation, resulting in the product being grinded from all directions. Once the product is grinded to the right size, it falls down through one of the outlet openings 6. At this point, the product is ball-formed or possibly oval. The shape and size of the end product depend on the shapes of the grooves 3 and 5, and on the distance between the rollers 1 and 2.

The size of the end product may vary on account of a variation in the distance between the rollers 1 and 2. When the distance increases, the protrusions 4 no longer extend so far into the grooves 3. The outlet openings 6 thus become larger, allowing larger products than before to fall through these outlet openings.

FIG. 2 shows a pair of rollers according to a second embodiment of the invention. The shape and dimensions of the rollers 1' and 2' correspond to those of the rollers 1 and 2 in FIG. 1 except that the rollers 1' and 2' in FIG. 2 comprise knife means 9 instead of a coarse grinding surface.

In FIG. 2, the knife means 9 consist of grooves 9 that extend radially into the bodies of the rollers 1' and 2'. The edges of the grooves 9 are sharp and thus provide the necessary grinding effect. As FIG. 2 shows, the grooves extend in a direction substantially parallel to the axial direction of the rollers. However, 'spiral-formed' grooves may also be utilized that form an angle to the axial direction of the rollers.

In FIG. 2, the rollers 1' and 2' are arranged at a distance larger than the distance between the rollers 1 and 2 in FIG. 1. Consequently, the size of the end product is also larger than in FIG. 1.

FIG. 3 shows an embodiment of a device of the invention. FIG. 3 shows a schematic outline of a peeling device. This device is able to utilize either the rollers shown in FIG. 1 or the rollers shown in FIG. 2. FIG. 3 is a side view of the device in partial cross-section.

The ends of the rollers are mounted in bearings 11 in the body of the device. The bearing structure 11 of at least one of the rollers allows the distance between the rollers to be adjusted.

The rollers are rotated by means of an electric motor 12, whose power is transferred to the roller 2 by means of a belt 13 in FIG. 3.

FIG. 4 shows a pair of rollers according to a third embodiment of the invention. This embodiment differs from the previous ones in that the protrusions 4 of the second roller 2" are cylindrical, i.e. they lack a groove that the protrusions are provided with in the previous figures. The surface of the protrusions 4 may be provided by a coarse grinding surface, as in the roller 2 of FIG. 1, or, alternatively, by grooves whose edges constitute knife means, as in the roller 2' of FIG. 2.

It is to be noted that the above description and the figures are only intended to illustrate the invention. Consequently, the embodiments of the present invention may vary within the scope of the attached claims.

What is claimed is:

1. A device for peeling or shaping products, comprising
   a frame,
   at least a first and a second grinding roller rotationally supported by the frame, at least one of the rollers comprising a grinding surface intended to contact the product during peeling or shaping, the grinding rollers being arranged substantially parallel and adjacent to each other for peeling or shaping the product, and
   a driving device for rotating the grinding rollers,
   the first grinding roller comprising a substantially cylindrical body provided with axially adjacent peripheral grooves, wherein
   the device comprises means for adjusting the distance between said first and second grinding roller, and
   the second grinding roller comprises a substantially cylindrical body provided with axially adjacent protrusions,
   the peripheral grooves of the first grinding roller and the protrusions of the second grinding roller being dimensioned and arranged relative to each other such that the protrusions at least partly extend into the grooves when the distance between said first and second grinding roller is minimized.

2. A device as claimed in claim 1, wherein the peripheral grooves of the first grinding roller and the protrusions of the second grinding roller are dimensioned such that the width of the peripheral grooves is larger than the width of the protrusions.

3. A device as claimed in claim 1, wherein the first and/or the second grinding roller comprises a coarse grinding surface.

4. A device as claimed in claim 1, wherein the first and/or the second grinding roller comprises a grinding surface provided with radially inward extending open grooves whose edges constitute peeling or shaping knife means.

5. A device as claimed in claim 1, wherein peripheral grooves are provided in the protrusions of the second grinding roller.

6. A roller for a device for peeling or shaping products, the roller comprising a a substantially cylindrical body comprising a plurality of protrusions spaced axially along the cylindrical body, each protrusion defined by a pair of flat radial surfaces and a peripheral concave groove between said flat radial surfaces, said roller having a grinding surface intended to contact the product during peeling or shaping.

7. A roller as claimed in claim 6, wherein said grinding surface comprises carborundum.

8. A roller as claimed in claim 6, wherein said grinding surface is provided with radially inward extending open grooves whose edges constitute peeling or shaping knife means.

* * * * *